Jan. 5, 1954 E. J. DUNHAM 2,665,022
CLAMP MEANS FOR INDUSTRIAL TRUCKS
Filed July 8, 1948 6 Sheets-Sheet 1
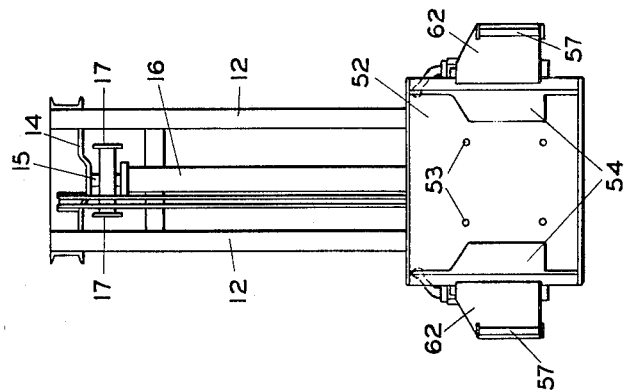
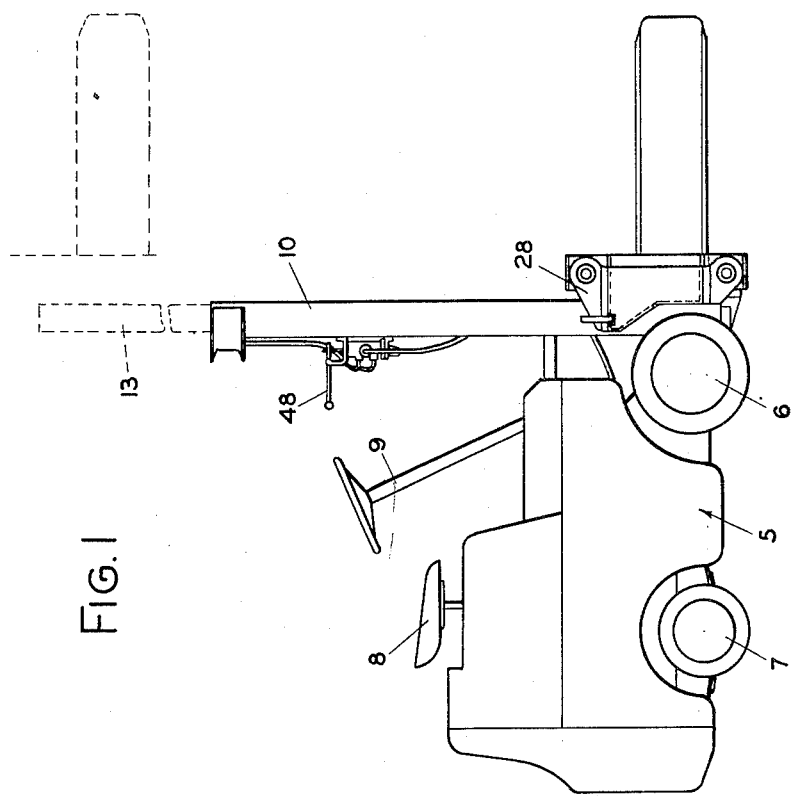
INVENTOR.
ELMER J. DUNHAM
BY *Walter E. Schirmer*
ATTY.

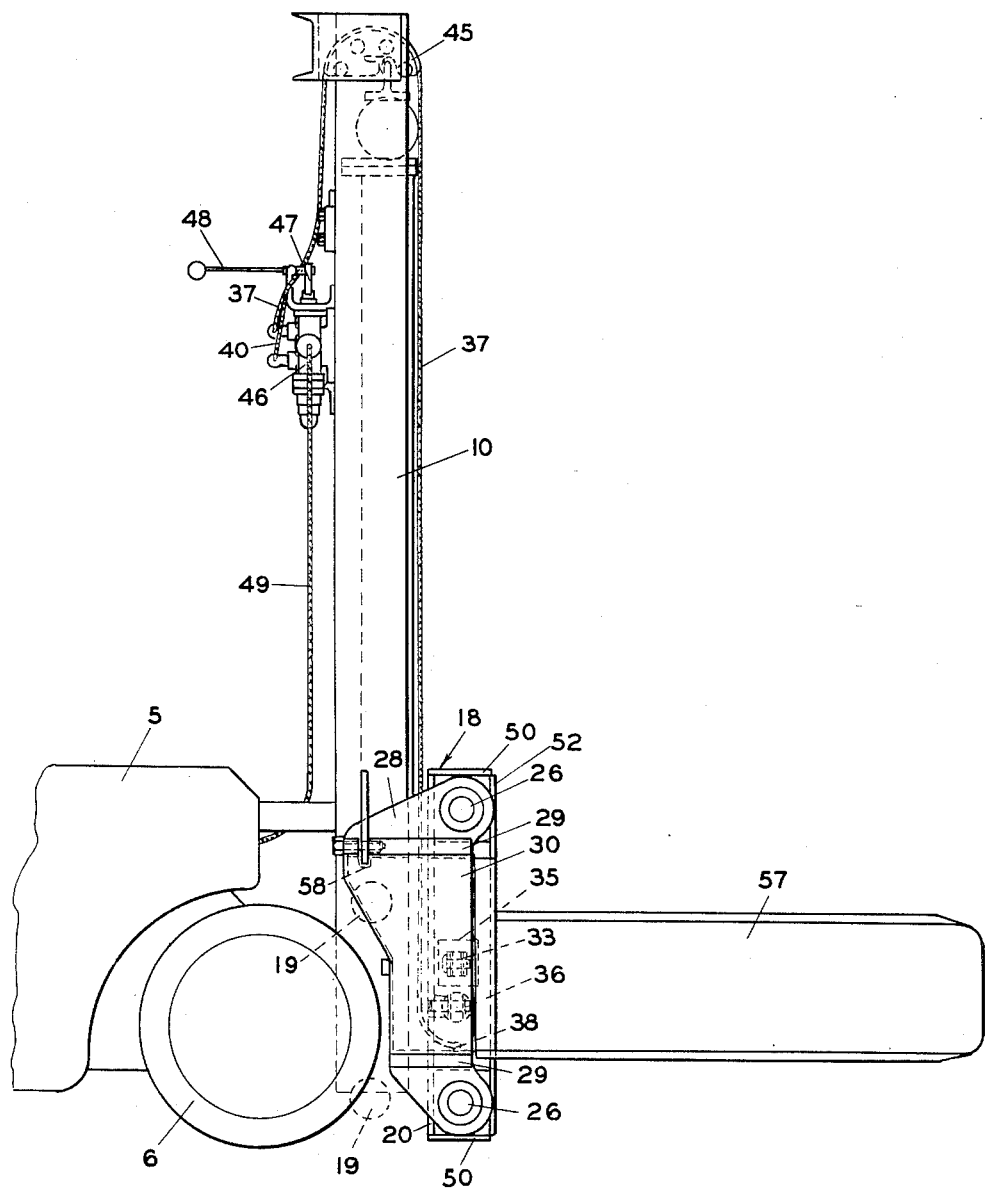

Jan. 5, 1954            E. J. DUNHAM            2,665,022
CLAMP MEANS FOR INDUSTRIAL TRUCKS
Filed July 8, 1948            6 Sheets-Sheet 4
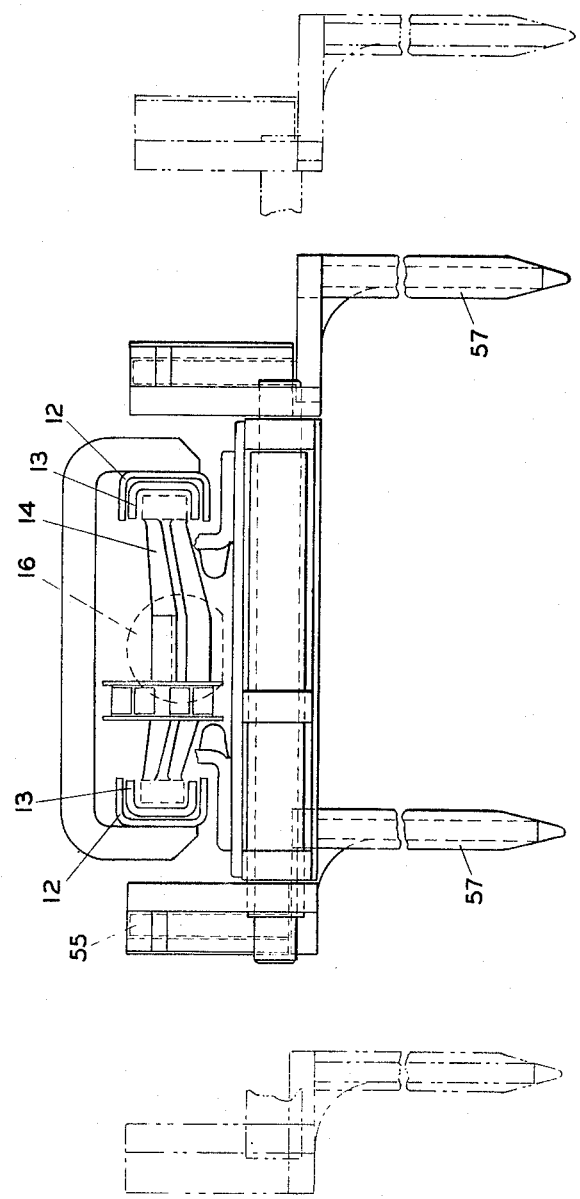
*INVENTOR.*
ELMER J. DUNHAM
BY
ATTY Jan. 5, 1954        E. J. DUNHAM        2,665,022
CLAMP MEANS FOR INDUSTRIAL TRUCKS
Filed July 8, 1948        6 Sheets-Sheet 5
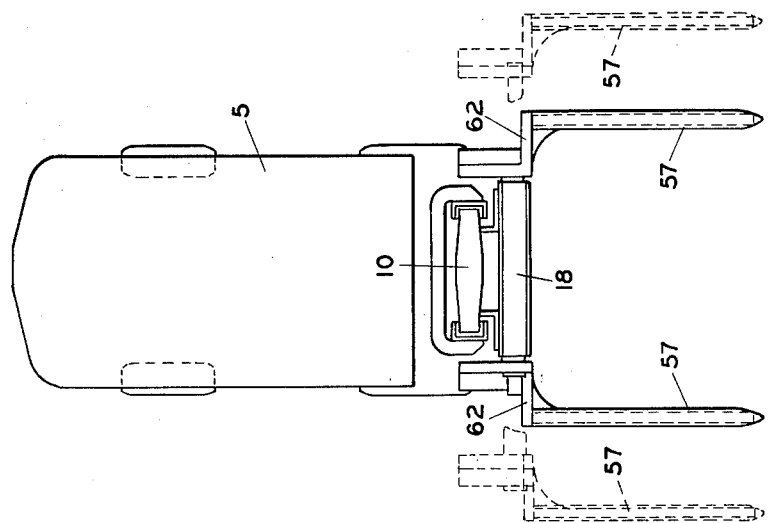
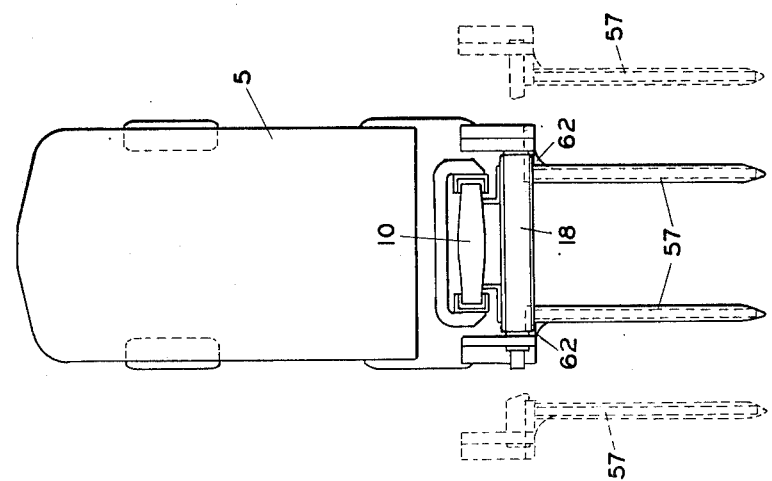
*INVENTOR.*
ELMER J. DUNHAM
BY
ATTY.

Jan. 5, 1954   E. J. DUNHAM   2,665,022
CLAMP MEANS FOR INDUSTRIAL TRUCKS
Filed July 8, 1948   6 Sheets-Sheet 6
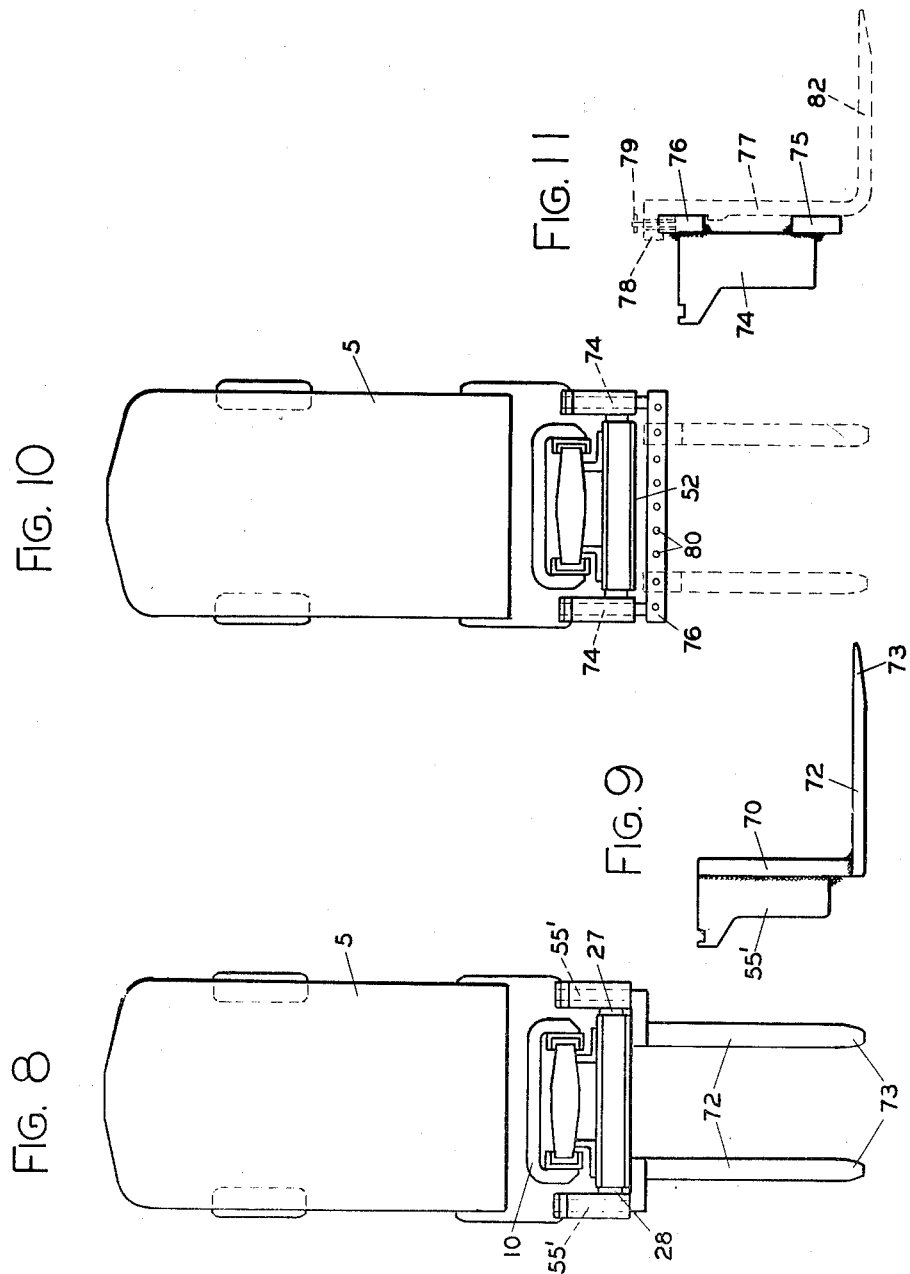
INVENTOR.
ELMER J. DUNHAM
BY Walter E. Shimer
ATTY.

Patented Jan. 5, 1954

2,665,022

UNITED STATES PATENT OFFICE 2,665,022

CLAMP MEANS FOR INDUSTRIAL TRUCKS

Elmer J. Dunham, Battle Creek, Mich., assignor to Clark Equipment Company, Buchanan, Mich., a corporation of Michigan Application July 8, 1948, Serial No. 37,606

6 Claims. (Cl. 214—653)

This invention relates to industrial trucks and more particularly to the mounting upon such trucks of a clamping mechanism useful for clamping various objects, and more particularly designed for use in the cotton industry for picking up and transporting bales of cotton and the like.

The invention contemplates adapting to the standard type of industrial lift truck which includes a vertical mast at one end thereof having a load supporting carriage mounted for vertical movement within said mast, a clamping device carried on the forward portion of said carriage and including arm members projecting forwardly of the mast and spaced laterally for movement over opposite sides of a bale of cotton or the like, with suitable actuating means for moving said arms toward each other to effect clamping pressure upon the sides of the bale in order to firmly clamp the same and lift it.

One of the primary features of the present invention is to provide a mechanism of this type which is sufficiently rigid to withstand the abuse to which such machines are subject in use and which is designed with sufficient clamping pressure to handle one or more bales of cotton simultaneously.

Another feature of the present invention is the provision of a mechanism utilizing hydraulic means mounted in the carriage for imparting the desired lateral movement to the projecting clamp arms.

Still another feature of the present invention is the provision of arm members which are detachable from the supporting frame and are so designed as to be readily removed from and secured in the frame in a variety of positions to provide for varying the space between said arms within a wide range, thereby adapting it to operation in conjunction with regular cotton bales or high density cotton bales and also for use with either one or more bales at the same time. These arm members are preferably provided with offset end portions to allow reversability of position, thus providing for a variety of clamping ranges which is desired for operation of the truck in this particular field.

Another feature of the present invention is the provision of suitable means carried by the vertical movable carriage providing adequate non-binding support for the arm members so that they may be readily extended and retracted by suitable hydraulic means operating between the respective arm brackets. The entire mechanism is mounted in a relatively compact space on the load supporting carriage with suitable control means carried on the rear of the uprights, or at any other convenient location for control by the operator in clamping and releasing the material engaged by the arms.

A primary purpose of the present invention is to provide a device of this type which is very rugged and will withstand severe usage without distortion of the arm members or distortion of the supporting frame, and which, at the same time, is quick and easy in operation so as to reduce to a minimum the time necessary for clamping and releasing each of the bales which may be carried by the truck.

A further purpose of the present invention is to provide a construction in which when it is not desired to use the truck for the handling of cotton or other baled goods, suitable arm portions can be inserted in place of the clamp arms, so that the truck may be used for the normal type of material handling generally provided by a conventional fork truck. In other words, the mechanism is so adapted that forks may be substituted in place of the clamp arms, which forks may be adjusted laterally either by use of the same spreading and retracting mechanism as used with the clamp arms, or the forks may be mounted for individual lateral spacing with the hydraulic mechanism being locked in one position.

Other objects and advantages of the present invention will appear more fully from the following detailed description, which, taken in conjunction with the accompanying drawings, will disclose to those skilled in the art, a preferred form of the present invention.

In the drawings:

Figure 1 is a side elevational view of a truck embodying the present invention.

Figure 2 is a front elevational view thereof.

Figure 3 is an enlarged side elevational view of the vertical mast and the load supporting carriage.

Figure 5 is a top view of the mechanism illustrating the manner in which the arms may be adjusted into the various positions.

Figures 6 and 7 are corresponding views showing various adjustments of the arm members.

Figure 8 is a plan view of a truck of the type previously disclosed, in which the clamp arms have been removed and bracket type forks substituted therefor.

3

Figure 4:
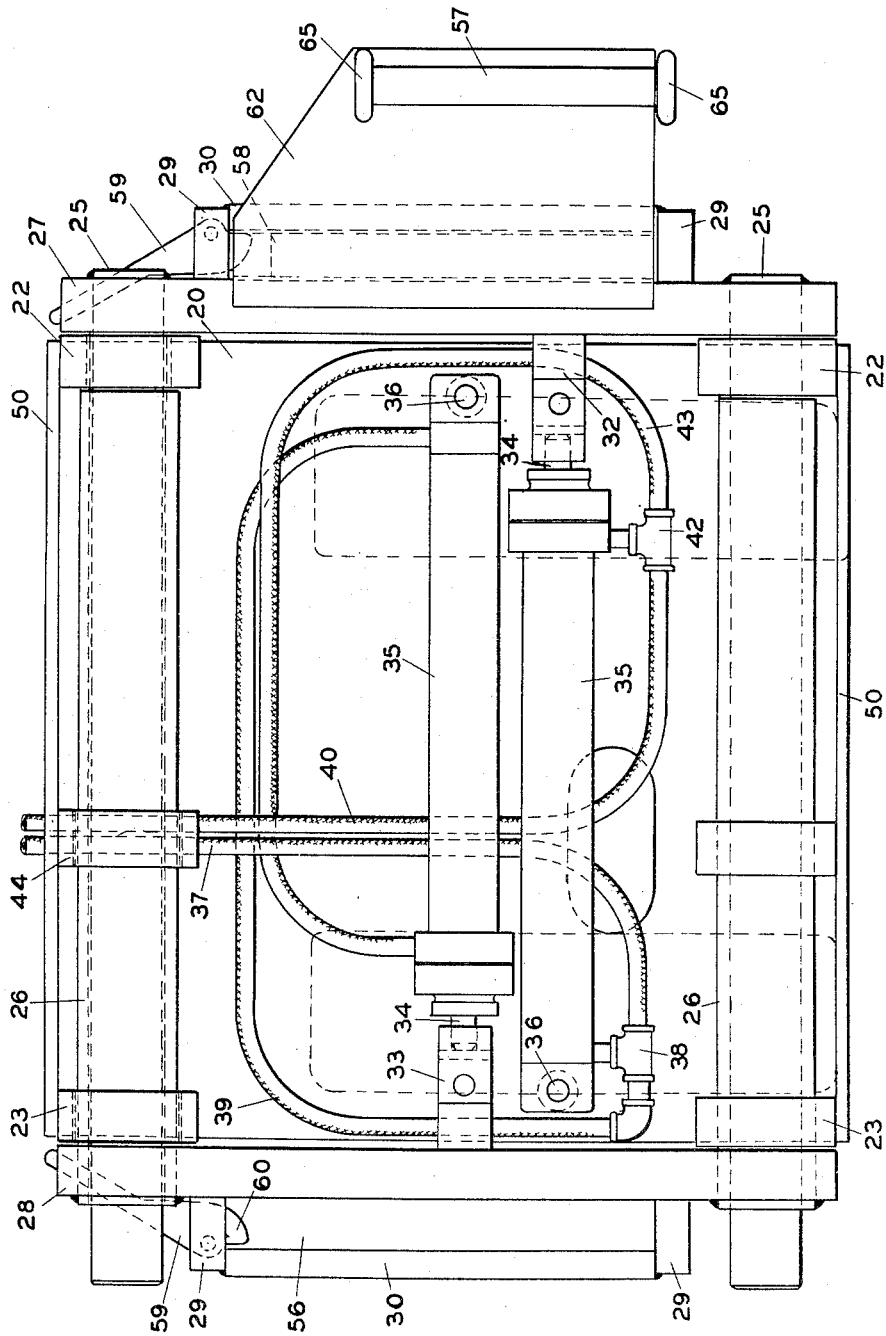
Figure 4 is a detail front view with the cover plate removed showing the operating mechanism for the clamp arms.

Figure 9 is a detail elevational view of the fork arm used with the truck shown in Figure 8.

Figure 10 is a corresponding plan view of a truck utilizing a modified means for mounting the forks thereon; and Figure 11 is an elevational view in detail of the fork construction and bracket arm used with the truck shown in Figure 10.

Referring now in detail to the drawings, the truck itself, which may be of any conventional type, is indicated generally by reference numeral 5, and is provided with the drive wheels 6 and the steering wheels 7.

The truck has the operator seat 8, adjacent to the steering column 9 and may be either powered by a battery and electric motor, or by a gasoline engine or the like.

Pivotally mounted at the forward end of the truck adjacent the drive wheels 6 and between such drive wheels, is a vertical mast, indicated generally at 10, comprising a pair of laterally spaced facing channel members 12, within which may be disposed secondary telescoping channel members 13, the secondary members being joined at their upper ends by a transverse cross head 14, carried on the upper end of a piston 15, operating within a hydraulic cylinder 16.

Suitable chain means is employed operating over the sprockets 17, carried by the cross head for raising and lowering a load supporting carriage, indicated generally at 18, and including roller members 19, shown in Figure 3, guided for movement within the inner pair of uprights 13. This arrangement may be similar to that disclosed in my Patent #2,178,370 issued October 31, 1939, and is a more or less standardized construction which, it is believed, needs no further description.

The load supporting carriage, indicated generally at 18, is preferably provided with a back plate 20, upon which is mounted, as shown in detail in Figure 4, a series of journal supports 22, at one edge of the plate and 23 at the opposite edge of the plate, which supports are adapted to receive extending rods 25 and sleeve members 26, which are arranged in telescoping relation and which carry, at their projecting ends, vertically extending arm support members 27 and 28. The arm support members 27 and 28, carry on their outer surfaces, vertically spaced laterally extending bracket portions 29, joined together by a vertical frame member 30, spaced outwardly of the outer surface of the members 27 and 28, to form therein an elongated rectangular slot extending normal to the surface of the plate 20.

Mounted on the inboard surface of the members 27 and 28 are brackets 32 and 33, respectively, which are rigidly secured to the arm supports 27 and 28. Each of these bracket members is adapted to receive the extending end 34 of a piston member carried within laterally extending cylinders 35 secured to the face plate 20 as by studs 36.

Preferably the connection between the piston ends 34 and the brackets 32 and 33 is by means of clevis joints to provide for some flexibility in this connection. The pistons 35 are provided at opposite ends with port means into which are connected hydraulic pressure lines, the pressure line 37 having a T connection 38, extending into one end of the lower piston 35, and having a second conduit 39 extending into the corresponding end of the upper cylinder 35.

The conduit 40 has the T connection 42, connecting with the head end of the lower cylinder

4

35, and an extension 43 extending into the head end of the upper cylinder 35. The two conduits 37 and 40 are extended vertically through a suitable support 44, carried by the face plate, and thence extend upwardly in front of the uprights as indicated in Figure 3, over a shoe member 45 at the upper end of the cross head and thence downwardly to a control valve, indicated generally at 46. Control valve 46 is provided with a plunger 47, adapted to be actuated by the lever 48, whereby fluid under pressure from the hydraulic system of the truck and connected to the valve 46 through the pressure line 49, may be selectively admitted to either of the conduits 37 or 40, to selectively extend or retract the pistons 34 within the cylinders 35.

The load supporting carriage is provided with top and bottom plates 50 which extend forwardly from the face plate 20, and a second face plate 52 closes over the rod and sleeve telescoping arrangement 26 as well as hydraulic lines and cylinders 35. This forward vertical plate may be provided with projecting pins or studs 53, preferably of one and one-half inches to two inches in length, which are adapted to pierce the bale of cotton when it is received against the face plate 52, in order to hold it against shifting. This plate 52 is provided with cutaway side portions, indicated at 54, for a purpose which will be described in detail hereinafter.

The clamp arms proper are shown in detail in Figures 5 to 7 inclusive, and comprise rearwardly extending portions 55, adapted to be received in the longitudinally extending rectangular slot 56, formed by the portions 28, 29 and 30 of the side frame members, and to fit therein in such position as to hold the forwardly projecting portion 57 of the clamp arm against relative movement. The upper surfaces of the rearwardly extending portions 55 of the arms are notched, as indicated at 58, to receive a clamp member 59, shown in Figure 4, which clamp member, when rotated into the position shown in Figure 4, has the detent portion 60 thereof, engaged within the slot or notch 58 to prevent the fork from being withdrawn from the rectangular slot 56.

Intermediate the forwardly projecting portion 57 of the clamp arm of the rearwardly extending portion 55 thereof, there is provided a laterally offset portion 62, which, with the clamp arm mounted as shown in Figure 4, throws the forwardly extending portion 57 thereof, laterally outwardly, thereby increasing the lateral distance between the two arms. In this arrangement, the two arms are in the position shown in Figure 2, with the forwardly projecting portions 57 spaced apart a distance sufficient to receive therebetween at least two bales of cotton when in extended position. The limits of the extension and retraction of the clamp arms during the clamping action are diagrammatically illustrated in Figures 6 and 7.

In Figure 7, it will be noted that the arms are arranged with the offset portions 62 extending to the outside. In this arrangement, when in retracted position, the forward portions 57 of the clamp arms are spaced apart as shown in full lines. When the pistons are actuated through the hydraulic control system, the arms are extended laterally away from each other into the dotted line position shown in Figure 7, thereby indicating the relative extent or range of movement of the arms during the clamping and releasing operations.

In Figure 6, the arms have been reversed in position with the offset portions 62 thereof, now extending inwardly into the space occupied by the cutaway portions of the face plate 52, indicated at 54 in Figure 2. In this arrangement, when in clamped or retracted position, the arms are as shown in full lines in Figure 6, and when the pistons are actuated, are capable of being extended out to the position shown in dotted lines in Figure 6. An intermediate position of the arms can be obtained by mounting the arms as shown in Figure 5, and the full and dotted lines shown in this figure illustrates the range of movement of the arms under such conditions.

With the simplified latch mechanism 59, it is apparent that the arms may be removed from and inserted into the load supporting carriage very simply and expeditiously, and consequently, can be changed in a few seconds to convert the truck from one handling a single bale of cotton to one which can handle two bales merely by reversal of the position of the clamp arms.

The control handle 48 for the valve 46 is disposed in position adjacent the operator so that he can reach forward with one hand and actuate this valve to either spread the arms apart or draw them together into clamping engagement.

It should also be noted that the projecting forward portions of the arms, indicated at 57, are provided at the top and bottom edges thereof, with extending flange portions 65. These flange portions assist in gripping the bale of cotton and preventing it from slipping relative to the arms, and since they overhang both sides of the intermediate web portion 57, are usually adaptable irrespective of the relative position of the arms in the load supporting carriage.

It will thus be seen that with the present construction, the industrial truck is now equipped with clamping means capable of use for handling cotton bales or the like, with the arms thereof being readily adjustable into several positions, depending upon the width of the bale to be handled and whether one or more bales are to be handled simultaneously. By the use of the telescoping rod and sleeve support for the load on the carriage, no binding action is possible, and the arms will slide freely toward and away from each other under the influence of the pistons 34 upon actuation of the hydraulic control system.

Considering now in detail the construction shown in Figures 8 to 11 in which the fork truck is provided with forks rather than the clamp arms of the previous embodiments, the truck 5, in Figures 8 and 9, has the same upright assembly 10 and the same elevating platform and load supporting carriage as the previous trucks, with the slots 56 formed at each side of the vertically extending brackets 27 and 28. However, in this form of the invention, the bracket arms 55' have welded to the front face thereof laterally offset portions 70, which extend vertically across the face of the bracket and which, at their lower ends, have welded thereto, the forwardly extending fork portions 72, having the tapered ends 73. These are locked in position within the slots 56 in the same manner as described in connection with the clamp arms, and by such locking action, are held rigidly against vertical movement, thereby providing a pair of forwardly extending forks which may be entered into a pallet and may be used to pick up and deposit material directly. The construction provides a very rigid fork, and the space within the forks may be varied within the limits of movement of the hydraulic mechanism.

In Figures 10 and 11, a similar arrangement is provided, except that in this case the bracket arms 74, corresponding to the bracket arms 55', are held in fixed laterally spaced position by means of two parallel vertically arranged spacing bars 75 and 76, welded thereto and extend transversely across the front face 52 of the load supporting carriage. The plates 75 and 76 thus prevent the operation of a hydraulic mechanism, but at the same time, correspond to the face plates generally used on elevating mechanism of this type and are adapted to receive a standard type of fork 77, which, at its upper end, has the flange portion 78 adapted to hold the fork against movement relative the bars 75 and 76, and carry a spring control pin 79, whereby the fork may be locked in any one of a number of openings 80, formed in the top bar to provide predetermined spacing of the fork member. The heel portion of the fork bears against the lower bar 75 to retain it in position and the forwardly extending portion 82 of the fork is adapted to receive the load.

Thus, in these forms of the invention shown in Figures 8 to 11, the clamp truck can be readily converted to a fork type truck utilizing the same elevating mechanism, and by merely removing the clamp arms and substituting therefor either fork arms or the fork supporting brackets shown in Figure 11.

I am aware that slight changes may be made in certain non-essential details of the present invention without in any way departing from the underlying principles thereof, but I do not intend to have the invention limited except as may be covered by the scope of the appended claims.

I claim:

1. In an industrial truck having a vertical mast at one end thereof including a load supporting carriage vertically movable in said mast, telescopic means extending laterally across said carriage and having vertical arm receiving portions at the ends thereof, hydraulically actuated means on said carriage for moving said portions toward and away from each other, load engaging arms having rearwardly extending vertical web portions detachably secured in said arm receiving portions and having forwardly extending load engaging portions, said arms having intermediate vertical laterally extending web portions for offsetting said forward portions from said rearward portions whereby variations in the spacing between said arms can be obtained by selectively mounting said rearwardly extending portions in said arm receiving portions, a face plate on said carriage intermediate said portions and covering said hydraulic means and said telescopic means, and said face plate having a plurality of load engaging prongs projecting forwardly therefrom for entering into a load clamped between said arms.

2. In an industrial truck having a vertical mast at one end thereof including a load supporting carriage vertically moveable thereon, vertically extending arm brackets at each side of said carriage, including vertically extending rectangular sockets, telescoping means on said carriage supporting said brackets for movement toward and away from each other, opposed hydraulic means on said carriage for actuating said brackets, and load-engaging arms having rearwardly extending vertical web portions seated in said sockets for supporting said arms and having forwardly extending load engaging portions, and said arms having intermediate vertical laterally extending web portions for offsetting said forward portions from said rearward portions whereby variations in spacing between said arms can be obtained by selectively mounting said rearwardly extending portions in said arm receiving portions.

3. The truck of claim 2 wherein said forwardly extending load engaging portions of said arms comprise a vertical web portion having overhanging flanges at the top and bottom thereof.

4. The truck of claim 2 wherein said forwardly extending load engaging portions of said arms comprise flat finger portions for supporting a load thereon.

5. The truck of claim 2 including interlocking means for detachably securing said rearwardly extending arm portions in said sockets.

6. In an industrial truck having a vertical mast at one end thereof including a load supporting carriage vertically movable in said mast, said load supporting carriage extending laterally of the truck and having vertical end portions, vertical arm receiving portions carried by said load supporting carriage at the vertical end portions thereof, load engaging arms having rearwardly extending vertical web portions detachably secured in said arm receiving portions and having forwardly extending load engaging portions, and said arms having intermediate vertical laterally extending web portions for offsetting said forward portions from said rearward portions whereby variations in the spacing between said arms can be obtained by selectively mounting said rearwardly extending portions in said arm receiving portions.

ELMER J. DUNHAM.

References Cited in the file of this patent
UNITED STATES PATENTS

| Number | Name | Date |
|---|---|---|
| 1,083,982 | Blessing | Jan. 13, 1914 |
| 2,178,369 | Dunham | Oct. 31, 1939 |
| 2,292,605 | Brase | Aug. 11, 1942 |
| 2,339,120 | Ulinski | Jan. 11, 1944 |
| 2,368,122 | Dunham | Jan. 30, 1945 |
| 2,370,528 | Fontaine | Feb. 27, 1945 |
| 2,420,828 | King | May 20, 1947 |
| 2,421,472 | Way | June 3, 1947 |
| 2,451,943 | Gunning | Oct. 19, 1948 |
| 2,456,320 | Repke | Dec. 14, 1948 |
| 2,475,367 | Avery | July 5, 1949 |
| 2,497,118 | Ferrario et al. | Feb. 14, 1950 |
| 2,509,023 | Vogel et al. | May 23, 1950 |
| 2,536,151 | Backofen et al. | Jan. 2, 1951 |
| 2,571,550 | Ehmann | Oct. 16, 1951 |

FOREIGN PATENTS

| Number | Country | Date |
|---|---|---|
| 30,111 | Norway | Oct. 13, 1919 |